United States Patent
Camacho-Lopez et al.

(10) Patent No.: US 7,122,229 B1
(45) Date of Patent: Oct. 17, 2006

(54) MOTION OF LIQUID CRYSTALINE ELASTOMERS AND METHOD OF USE THEREOF

(75) Inventors: Miguel Angel Camacho-Lopez, Tenancingo Edo. (MX); Peter Palffy-Muhoray, Kent, OH (US); Michael J. Shelley, New York, NY (US)

(73) Assignee: Kent State University, Kent, OH (US)

( * ) Notice: Subject to any disclaimer, the term of this patent is extended or adjusted under 35 U.S.C. 154(b) by 293 days.

(21) Appl. No.: 10/732,880

(22) Filed: Dec. 10, 2003

(51) Int. Cl.
*C09K 19/00* (2006.01)
*C09K 19/38* (2006.01)
*C09K 19/52* (2006.01)

(52) U.S. Cl. .................. 428/1.1; 252/299.01
(58) Field of Classification Search ........... 252/299.01; 428/1.1
See application file for complete search history.

(56) References Cited

U.S. PATENT DOCUMENTS

| | | | |
|---|---|---|---|
| 4,293,435 A | 10/1981 | Portugall et al. |
| 4,358,391 A | 11/1982 | Finkelmann et al. |
| 4,388,453 A | 6/1983 | Finkelmann et al. |
| 5,151,481 A | 9/1992 | Finkelmann et al. |
| 5,164,111 A | 11/1992 | Dorsch et al. |
| 5,190,689 A | 3/1993 | Finkelmann et al. |
| 5,350,966 A | 9/1994 | Culp |
| 5,385,690 A | 1/1995 | Finkelmann et al. |
| 5,735,607 A | 4/1998 | Shahinpoor et al. |
| 5,900,405 A | 5/1999 | Urry |
| 6,060,159 A | 5/2000 | Delgado et al. |
| 6,065,572 A | 5/2000 | Schober et al. |
| 6,143,138 A | 11/2000 | Becker |
| 6,312,770 B1 | 11/2001 | Sage et al. |
| 2001/0032663 A1 | 10/2001 | Pelrine et al. |
| 2002/0050769 A1 | 5/2002 | Pelrine et al. |

OTHER PUBLICATIONS

P.I.C. Teixeira, M. Warner, "Dynamics of soft and semisoft nematic elastomers", The American Physical Society, Jul. 1999, vol. 60, No. 1, pp. 603-609.

Temmen, H., Pleiner, H., Liu, M., Brand, H., "Convective Nonlinearity in Non-Newtonian Fluids", *Physical Review Letters*, The American Physical Society, Apr. 10, 2000, vol. 84, No. 15, pp. 3228-3231.

Finkelmann, H., Nishikawa, E., "A New Opto-Mechnical Effect in Solids", *Physical Review Letters*, The American Physical Society, Jul. 2, 2001, vol. 87, No. 1, pp. 15501-1-15504-4.

Jamieson, V., Materials Science "Crystal Swims like a fish to escape from laser light", NewScientist, Mar. 22, 2003, p. 18.

M. Camacho-Lopez, H. Finkelmann, M. Shelley, P. Palffy-Muhoray, "Swimming towards the dark: A photophobic light-driven elastomeric swimmer", The First World Congress on Biomimetrics & Artificial Muscles, Dec. 10, 2002; http://www.world-congress.net/ Session P18—Polymer Gels Oral Session Mar. 5, 2003.

*Primary Examiner*—Shean C Wu
(74) *Attorney, Agent, or Firm*—Fay, Sharpe, Fagan, Minnich & McKee, LLP

(57) ABSTRACT

A method for inducing movement of an object in contact with a fluid, includes providing a flexible object, and exposing the object to an energy source. The energy source induces a change in the shape of the object, and movement occurs as a result of the change in shape of the object. The flexible object may be a liquid crystal elastomer object. An apparatus for producing work, including a liquid crystalline elastomer capable of changing shape upon exposure to an energy source is also disclosed.

31 Claims, 6 Drawing Sheets

MOTION OF LIQUID CRYSTALINE ELASTOMERS AND METHOD OF USE THEREOF

GOVERNMENT LICENSE RIGHTS

The U.S. Government has a paid-up license in this invention and the right in limited circumstances to require the patent owner to license others on reasonable terms as provided for by the terms of Grant No. 0132611 awarded by the National Science Foundation.

BACKGROUND OF THE INVENTION

The present invention relates generally to a method and apparatus for producing movement of an object on a fluid surface. More particularly, the present invention relates to inducing motion in a flexible object by exposure to a radiative or conductive energy source. Specifically, the present invention relates to using energy to alter the shape of a flexible object in contact with a fluid to produce a resultant displacement of the object from its original position.

In recent years, the introduction of smart materials have expanded the application of various materials. Smart materials are novel materials that respond to external stimuli such as a change in temperature, pH, moisture, or electric or magnetic fields. One example of such materials are piezoelectric materials, which change shape or some other property in response to the application of an electric field. One such material is disclosed by U.S. Pat. No. 5,350,966, which provides a piezocellular device that may be used as a propulsion device. The device converts electrical energy into fluid energy by causing the curvature of membranes with the application of an electric current.

One of the newest type of smart materials are liquid crystal elastomers. Liquid crystal elastomers are a new class of materials which combine a crosslinked network structure and the long range orientational ordering of the liquid crystal phase. The interaction between these two effects gives rise to materials with new phenomena which includes electrically and optically induced shapes changes, mechanically induced director reorientation, piezoelectric effects as well as additional effects. These materials combine the various broken symmetries of liquid crystalline phases with the elasticity of polymer networks.

One apparent property of these materials is that liquid crystal elastomers can readily undergo shape changes in response to external stimuli. Liquid crystalline elastomers have been described in U.S. Pat. No. 4,388,453, the disclosure of which is hereby incorporated by reference. The elastomers disclosed therein are organopolysiloxanes that have mesogenic pendant groups attached as side chains. The elastomers may be crosslinked by any of several means, including the use of organopolysiloxane crosslinking compound having at least two vinyl groups. Other polymers having liquid crystalline phases are described in U.S. Pat. Nos. 5,385,690; 5,190,689; 5,164,111; 5,151,481; 4,358,391; and 4,293,435; the disclosures of which are also incorporated herein by reference.

More recently, the shape changing response of nematic elastomers to light has been noted by Finkelman et al. (Physical Review Letters, 2 Jul. 2001, Vol 87, No. 1, pgs 015501-1–015501-4). Finkelmann et al. noted that, upon exposure to light, a nematic elastomer will reversibly change shape.

BRIEF SUMMARY OF THE INVENTION

In one embodiment, the present invention provides a method for inducing movement of an object, the method including the steps of providing an object made from a liquid crystal elastomer, and exposing the object to an energy source, whereby the energy source induces a shape change in the object, resulting in the movement of the object.

In a second embodiment, the present invention provides an apparatus for producing work including a liquid crystal elastomer capable of changing shape upon exposure to an energy source.

In a third embodiment, the present invention provides a method for inducing movement of a flexible object in contact with a fluid, the method comprising providing a flexible object, and exposing the object to an energy source, whereby the energy source induces a shape change in the object, resulting in the movement of the object.

DETAILED DESCRIPTION OF THE INVENTION

Figure 1:
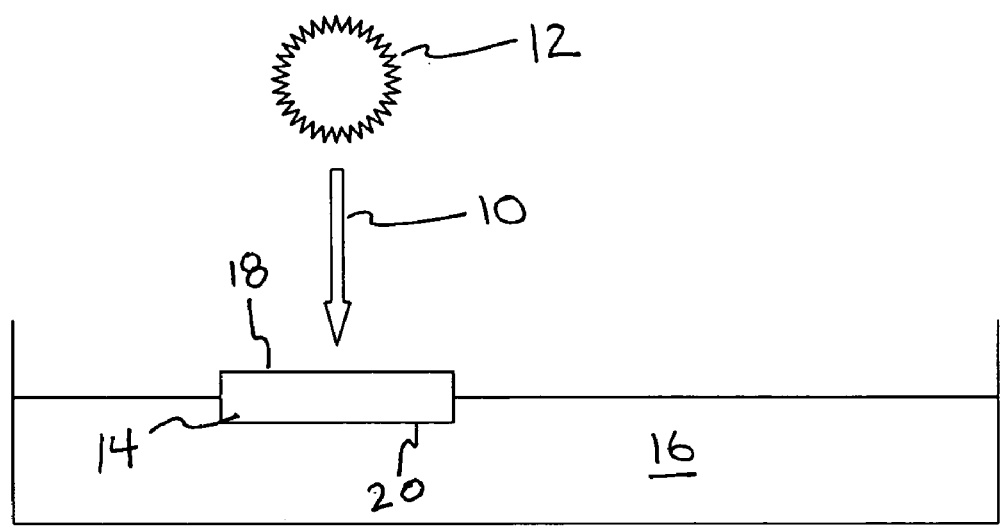
FIGS. 1–3 are a depiction of the steps bringing about the motion of a liquid crystal elastomer on the surface of a fluid.

Polymer liquid crystal (PLCs) are a class of materials that combine the properties of polymers with those of liquid crystals (LC). These materials combine the properties of polymers with that of liquid LC phases, showing the same mesophases characteristic of ordinary liquid crystals, yet retain many of the useful and versatile properties of polymers. Due to their mobility, polymeric chains are able to glide past each other, similar to that of high viscosity liquids.

In liquid crystal polymers the monomers can generally be assembled in two ways. The liquid crystal part or mesogenic unit of the polymer may be part of the polymer backbone resulting in a main chain polymer. Alternatively the mesogenic unit may be attached to the polymer backbone as a pendant group, resulting in a side-chain polymer. Several different types of polymer liquid crystal are represented schematically below. Other arrangements are also possible. The mesogenic units may be disc-like or rod-like and are depicted below by the rectangles. The side chain liquid crystal polymer can be visualized as containing a flexible polymer with the mesogenic units attached along its length by short flexible "spacer" units. It is the anisotropic, rigid section of the mesogenic units that display orientational order in the liquid crystal phases.

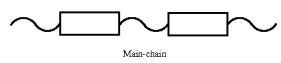

Main-chain

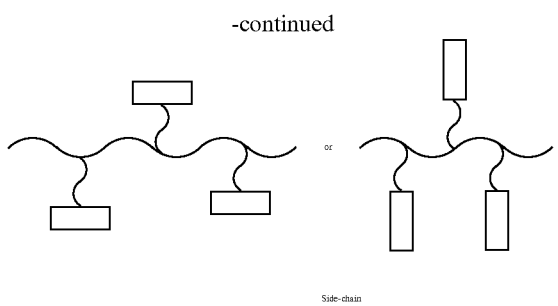

Side-chain

Recently, there has been an increased interest in LC elastomers (LCE), which combine the properties of LC phases with an inherent elastomer property, i.e. rubber elasticity. Liquid crystal elastomers are weakly crosslinked networks of mesogenic polymer chains with mesogenic groups either incorporated into the polymer chain or as side groups and capable of spontaneous orientational ordering.

The introduction of intermolecular crosslinks prevents translational diffusion and macro-brownian motion, while retaining the high flexibility of the polymer chain segments. Irrespective of the cross link sites, the polymer may be regarded as an elastic liquid, with the mesogenic molecule attached to the polymer retaining a liquid-like character. Such new materials have unique properties, enjoying the unusual dual characteristics of the directional behaviours associated with liquid crystals, together with the elasticity associated with crosslinked rubbers.

Because of the presence of crosslinking, LCEs are characterized by strong coupling between orientational order and mechanical strain. Thus, excitations that result in a change of the order parameter can therefore bring about large mechanical deformations.

As noted above, a method for inducing the movement of a flexible object in contact with a fluid and an apparatus for producing work which utilizes the movement of a flexible object in contact with a fluid is provided by one embodiment of the invention. In one preferred embodiment of the invention, the flexible object includes a liquid crystal elastomer and movement is induced by a radiative or conductive energy source. Of course, other flexible objects and other energy sources are also contemplated by the invention. Thus, for example, a mechanical energy source may be used to induce a shape change and a resultant movement of the flexible object. For convenience, however, the inventive concepts discussed herein will be described with reference to liquid crystal elastomers as the flexible object and with a laser, light or some other radiative energy source.

Such a method and apparatus is based on the discovery that upon exposure to light or other radiation, liquid crystal elastomers will not only change shape, but that this shape change may be utilized to induce movement of the liquid crystal elastomer in contact with a fluid. It has not been previously recognized that a LCE will exhibit photophobic behavior when in contact with a fluid surface.

As used herein and with reference to the disclosed embodiments, the terms "liquid crystal elastomer" and "LCE" are meant to be non-limiting and therefore include liquid crystal elastomer gels having a LCE network with one or more additional components that are not covalently bonded to such network. These gels include liquid crystal elastomers swelled with a solvent or other component, in which the solvent may or may not be liquid crystalline itself. These gels also include conventional (non liquid crystalline) elastomers with a liquid crystal solvent.

Figure 2:
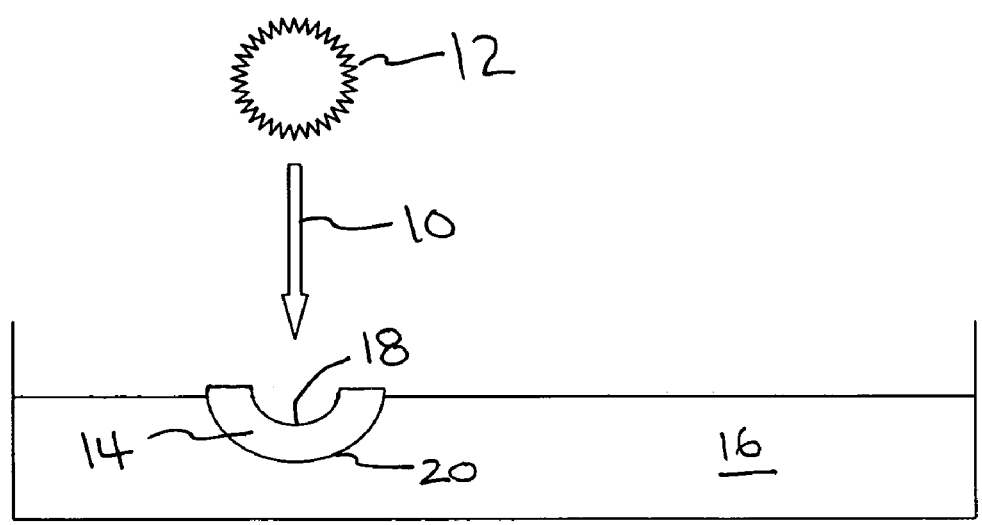
Figure 3:
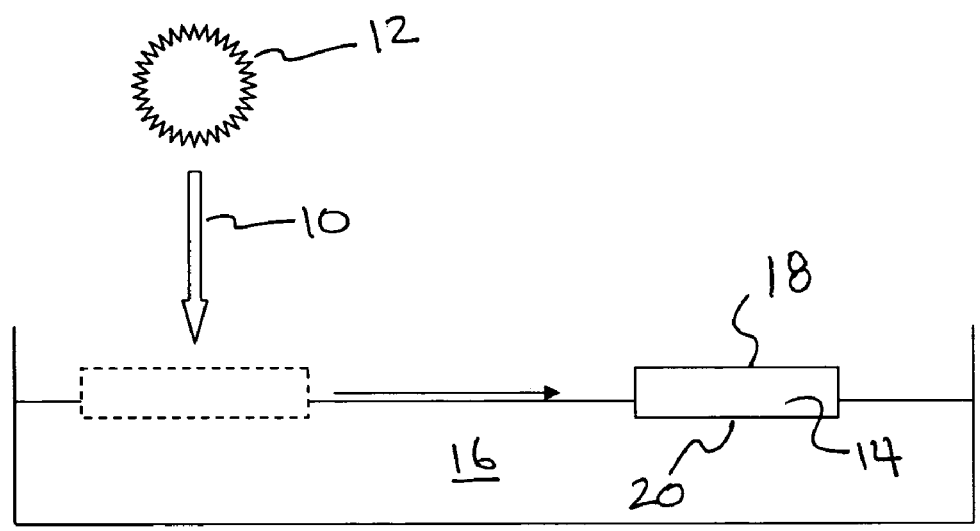

Generally, a method according to one embodiment of the invention is shown in FIGS. 1–3. As seen therein, radiation or some other emission 10 from a radiative or conductive energy source 12 is directed toward a LCE 14 in contact with a fluid 16. Although the energy source 12 is typically a laser or some other light source and the emission 10 is thus a light beam, other energy sources may also be used depending on the identity of the LCE, such as other electromagnetic radiation (infrared, UV, etc.), an electric or magnetic field, etc. Thus, although the energy source 12 will further be described herein as a light source and the emission 10 as a light beam or light ray, it should be recognized that the invention is not limited to the same. The light source 12, in turn, can be a single wavelength source such as a laser or a broad spectrum light source such as an incandescent bulb.

Without wishing to be bound by any particular theory, applicants believe that when the light beam 12 strikes a first surface 18 of the LCE 14, the orientation of the mesogenic units of the LCE is changed, which in turn effects a change in the material shape and conformation of the LCE. Thus, the anisotropic structure of the material is believed to play a role in the shape change of the material. Specifically, the first surface 18 of the material on which the light beam impinges contracts as the orientation of the mesogenic phases of the LCE polymer chains changes. An opposite second surface 20 of the LCE contracts to a much smaller extent or not at all. This selective contraction of one side of the LCE forces the edges of the LCE to curl toward the beam, bending the LCE 14 and producing a curved shape to it, as seen in FIG. 2.

The dynamics of this shape change of an LCE in response to exposure to light are detailed by the inventors in the article "A New Opto-Mechanical Effect in Solids", Finkelman et al. (Physical Review Letters, 2 Jul. 2001, Vol 87, No. 1, pgs 015501-1–015501-4).

The method by which the light bends the LCE may be due to a number of factors. Again, not wishing to be bound to any particular theory, it is believed by the inventors that the optical field changes the order parameter in the in the LCE through one or more of direct heating, "effective heating" via photoisomerization, direct optical torque via angular momentum transfer from the light, and "indirect" optical torque resulting from orientational Brownian ratchet in which the light drives a molecular motor with no angular momentum transfer from the light.

In a specific embodiment, as seen in FIG. 2, the bending of the LCE forces the center of the LCE on the opposite second surface 20 of the LCE deeper into the fluid 16. This increases the potential energy of the fluid. It is believed by the applicants that fluid pressure creates an upward force on the LCE 14 and tries to force the LCE to flatten. The continued presence of the light beam, however, prevents this. With reference to FIG. 3, the potential energy thus created by the bending of the LCE is released by movement of the LCE away from the light source and the flattening of the LCE as it escapes the path of the light beam. As the LCE 14 moves away from the light 10, the mesogenic phases in the LCE revert to their original orientation, allowing the LCE to flatten and releasing the potential energy, causing the LCE to accelerate. Thus, it appears that light provides the energy, but neglible if any momentum for the motion.

More specifically, movement of the object is caused by interaction of the object with the fluid. The shape change of the object exerts a force on the fluid. By Newton's third law of thermodynamics, the fluid exerts an opposite force on the object, thereby imparting movement to the object.

The observed dynamics of this process is unusual in that it is predicated on the transfer of information as well as energy from the light source to the LCE. The significance of this can be appreciated by considering that in most applications, an energy source is attached to the object that it is moving, i.e. a gas tank attached to a car. In at least one embodiment of the present invention, however, functioning of the light as an energy source for the movement of the LCE is predicated on the light not being fixed in relation to the LCE. That is, a light source having an emission with a fixed point of impact on an LCE in the present application would not impart motion to the LCE since there would be no place for the LCE to escape the light. Rather, in such an embodiment, the movement of the LCE is based on the LCE's ability to alter the position at which the light impacts its surface by undergoing movement. Of course, the light source could be fixed in relation to the LCE, with the point of impact of the emission on the LCE being varied, such as through the use of, for example, a moveable mirror which can be rotated to reflect the light onto a different part of the LCE. Thus, the light carries both energy and information to the system.

The LCE suitable for use in one embodiment of the present invention may be any elastomer displaying liquid crystalline properties and having an anisotropic structure. Such materials are known in the art such as in, e.g., U.S. Pat. Nos. 4,388,453 and 5,385,690, the disclosures of which are incorporated herein by reference in their entirety. As described above, LCEs suitable for use in the present invention can have mesogenic phases (groups) incorporated into the polymer backbone or present in side chains. In a preferred embodiment, the LCE may be an organopolysiloxane having mesogenic pendant side chains. In such an embodiment, the organopolysiloxane main chain may be represented by formula I, where X is an alky group, preferably a methyl group, and n is between about 20 and about 500.

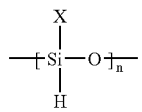

The organopolysiloxane may have mesogenic groups attached to the main chain. Any mesogenic group may be used in the present invention, including those described in U.S. Pat. No. 5,164,111. The mesogenic group may have a bi-phenyl structure, such as those mesogenic groups disclosed in U.S. Pat. No. 4,293,435. An exemplary mesogenic group is shown by formula II, wherein Y is a Schiff base, a diazo compound, an azoxy compound, a nitrone, a stilbene, an ester or is not present (resulting in a diphenyl), and wherein $R^1$ and $R^2$ are alkyl, alkoxy, alkyl, cyano, $NO_2$, or halogen containing groups.

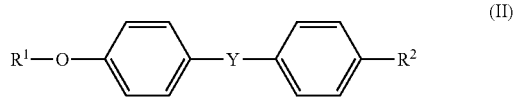

Thus, a preferred class of mesogenic groups is summarized by formula III, where $R^1$ is an alkenyl group and $R^2$ is selected from the group consisting of alkoxy, cyano, and alkyl groups.

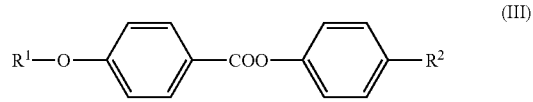

An exemplary mesogenic pendant group is represented by formula IV.

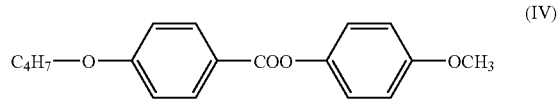

Other mesogenic groups include cyanoacrylic acid ester-containing groups such as those disclosed by U.S. Pat. No. 5,151,481.

A flexible bonding element may exist between the mesogenic pendant group and the polymer backbone. Of course, as described above, the mesogenic groups may be incorporated into the polymer backbone itself rather than be attached as side groups.

The LCE also preferably contains one or more crosslinking compounds for linking the chains of the LCE together. Any suitable crosslinking compound may be used, including flexible crosslinks varying in functionality. Such crosslinking compounds may or may not possess mesogenic phases themself. Such compounds are known in the art and include, for example, various acrylates, amines, amides, oligoalkenes, etc. A preferred crosslinking system is a combination of a first linker (V),

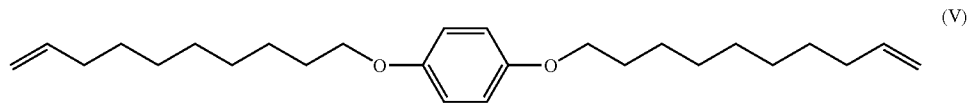

and a second photoisomerizable linker (VI).

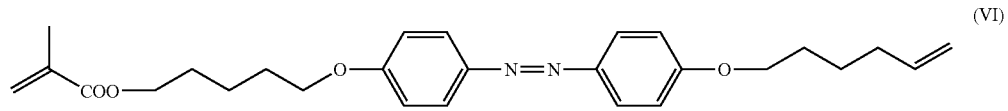

Polyfunctional crosslinkers are particularly useful. An exemplary polyfunctional crosslinking agent suitable for use in the present invention is represented by formula VII.

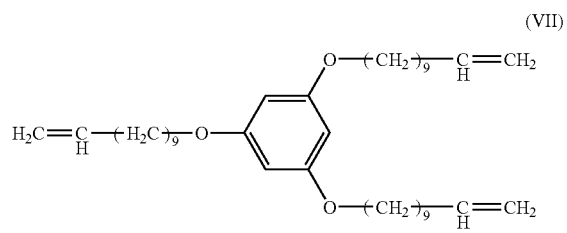

The degree of crosslinking in the LCE compounds for use in the present invention is not critical. Generally, however, best results are achieved with a crosslink density of from about 5% to about 25%. It is in this range that the elastic properties of the LCE are sufficient to allow for adequate bending and relaxation of the LCE in response to the light source.

The photo-induced bending of the LCE and the resultant movement of the LCE in one embodiment of the present invention is increased by the addition of a photosensitive dye to the LCE polymer composition. Preferably, the dye is an azo dye and is dispersed in the polymer composition in an amount of from about 0.01% to about 4% by weight of the polymer composition. It is thought that the dye molecules increase the sensitivity of the LCE to light and aid in the bending of the LCE by contracting, which changes the orientation order of the neighboring LCE molecules. This is thought to be due, at least in part, on the fact that when azo dyes and other photoisomerizable molecular rods absorb light, they undergo a trans to cis isomerization whereupon they are bent. Suitable azo dyes for use in the presenting invention include Disperse Orange 1, Disperse Red 1, etc.

The fluid for use in the present invention can be any suitable organic or inorganic fluid that will support the LCE. In most instances, the fluid will be a liquid, although this is not required. Thus, it is contemplated that it may be possible for the fluid to be a dense gas or other material having fluid like properties. Thus, the number of suitable fluids is extremely broad and the choice of a fluid should be considered non-limiting and be based on individual preference and factors such as cost, etc. For practical purposes, it is desired that the fluid be non-toxic, non-volatile, and non-reactive with respect to the LCE. Thus, preferred fluids include, for example, water, ethylene glycol, alcohols, etc. Applicants have noticed that the speed of the LCE is approximately inversely related to the viscosity of the fluid, with a given light source. This is explained in more detail in the examples section below. Thus, the use of relatively low viscosity fluid, such as water, will generally result in a speedier LCE.

In the embodiments described above, the LCE is described as being on the surface of the fluid. This is the most preferred position of the LCE, as the light beam will thus have the most direct path to the LCE without the chance for diffraction, absorption or other optical interference from the fluid. This will be the most common position in most instances as well, as the majority of suitable LCE's for use in the invention will have a lower density than many of the above described fluids, and thus float on the surface of the fluid. Of course, it is possible for the LCE to be positioned below the surface of the fluid, with perhaps in some instances a reduction in the speed and forcefulness of the movement of the LCE.

The LCE for use in the present invention can be any shape. Thus, the LCE shape can be geometrically shaped or irregular shaped. It should be noted that greater speed and total displacement are experienced when the LCE has a high surface area to volume ratio. Thus, flat shapes such as disks and the like provide greater movement than LCEs in the shape of spheres, cubes, etc. Likewise the size of the LCE is not limited. Of course, a greater intensity energy source will generally be needed the larger the size of the LCE.

In another embodiment, the LCE may be held in a fixed position and the resultant force used to produce work. Thus, for example, a peristaltic pump could be created using a tubular LCE. By holding the LCE stationary and by varying the point on the surface of the LCE at which the light strikes, the resultant shape change of the LCE could be used to pump fluid through the LCE. Other work producing embodiments are also possible.

EXAMPLES

To demonstrate the effectiveness of the present invention, a nematic elastomer was provided and exposed to light as follows. The following examples should not be viewed as limiting the scope of the invention. The claims will serve to define the inventions.

A silylene-based nematic LCE containing 0.1% Disperse orange 1 azo dye was prepared according to methods known in the art. The nematic elastomer had a main chain corresponding to formula I, where n=100. The side chains, represented by formula IV, were grafted to the main chain of the polymer. The polymer was subsequently crosslinked using the compound having the formula represented by VII and had a specific gravity of 0.973.

Disc shaped samples with thicknesses of 0.3 mm and diameters of 5 mm, as well as samples of other shapes, were floated on water, and were illuminated with light from an Ar ion laser emitting at a wavelength of 524 nm. Within about 10 milliseconds (ms), the LCE began to change shape and bend up at the edges, and began to move away from the illuminated region after about 60 ms. As described above, the phenomenon is depicted in FIGS. 1–3.

Figure 4:
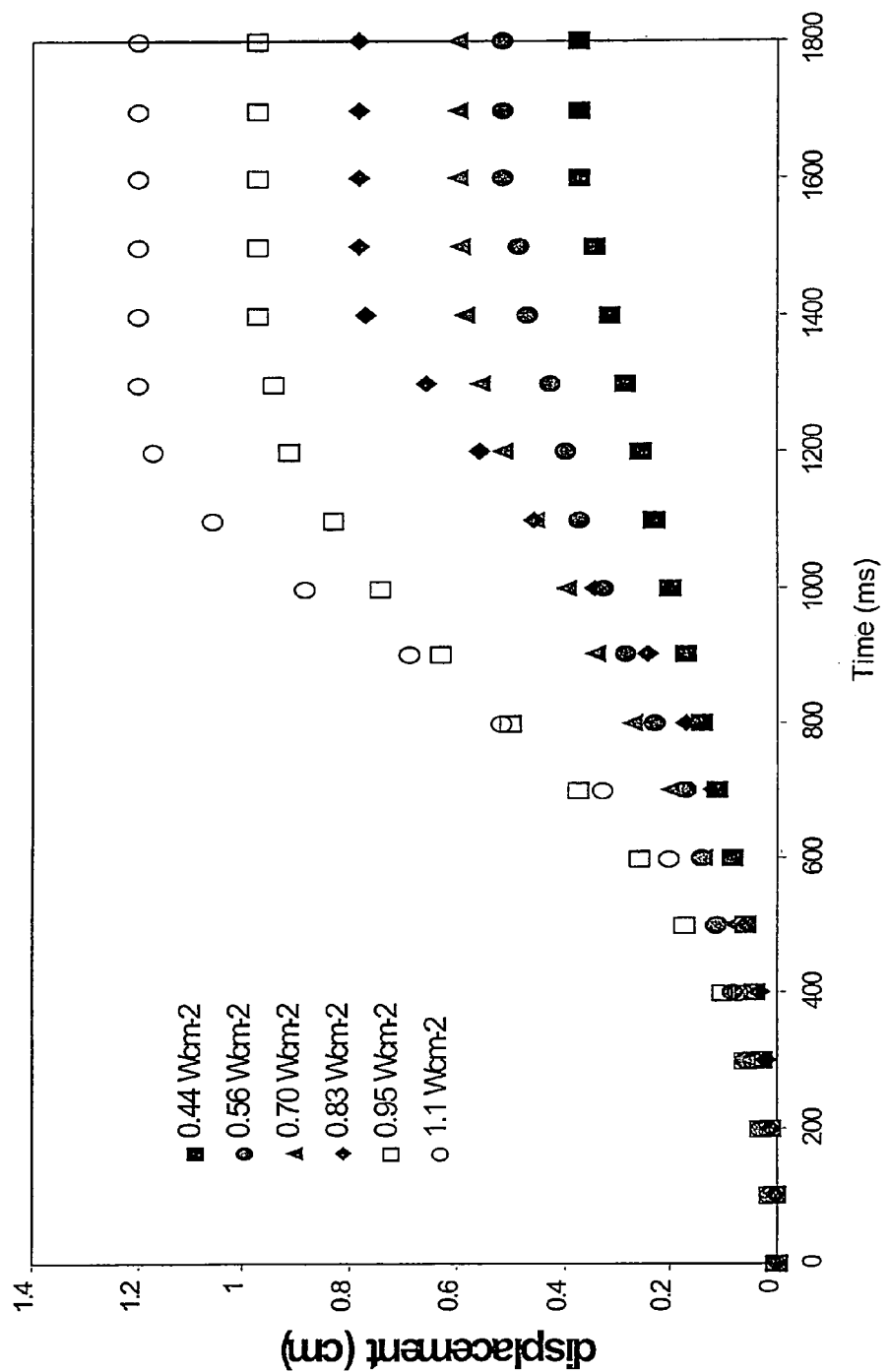
FIG. 4 is a graph showing the displacement of a liquid crystalline elastomer over time at various light intensities.

The silylene-based nematic LCE was exposed to varying light intensities and the resulting displacements were measured. The photophobic behavior was observed for laser intensities of 0.4 W/cm$^2$ to 1.2 W/cm$^2$. A graph showing the displacement of the sample over time at various light intensities is shown in FIG. 4. A displacement of 1.2 cm was observed when the laser intensity was 1.1 W/cm$^2$, with a maximum speed of 1.8 cm/s. For circular disks, the sample returned to its original flat shape when removed from the light beam. Irregular shaped samples tended to not return to their original shape.

Figure 5:
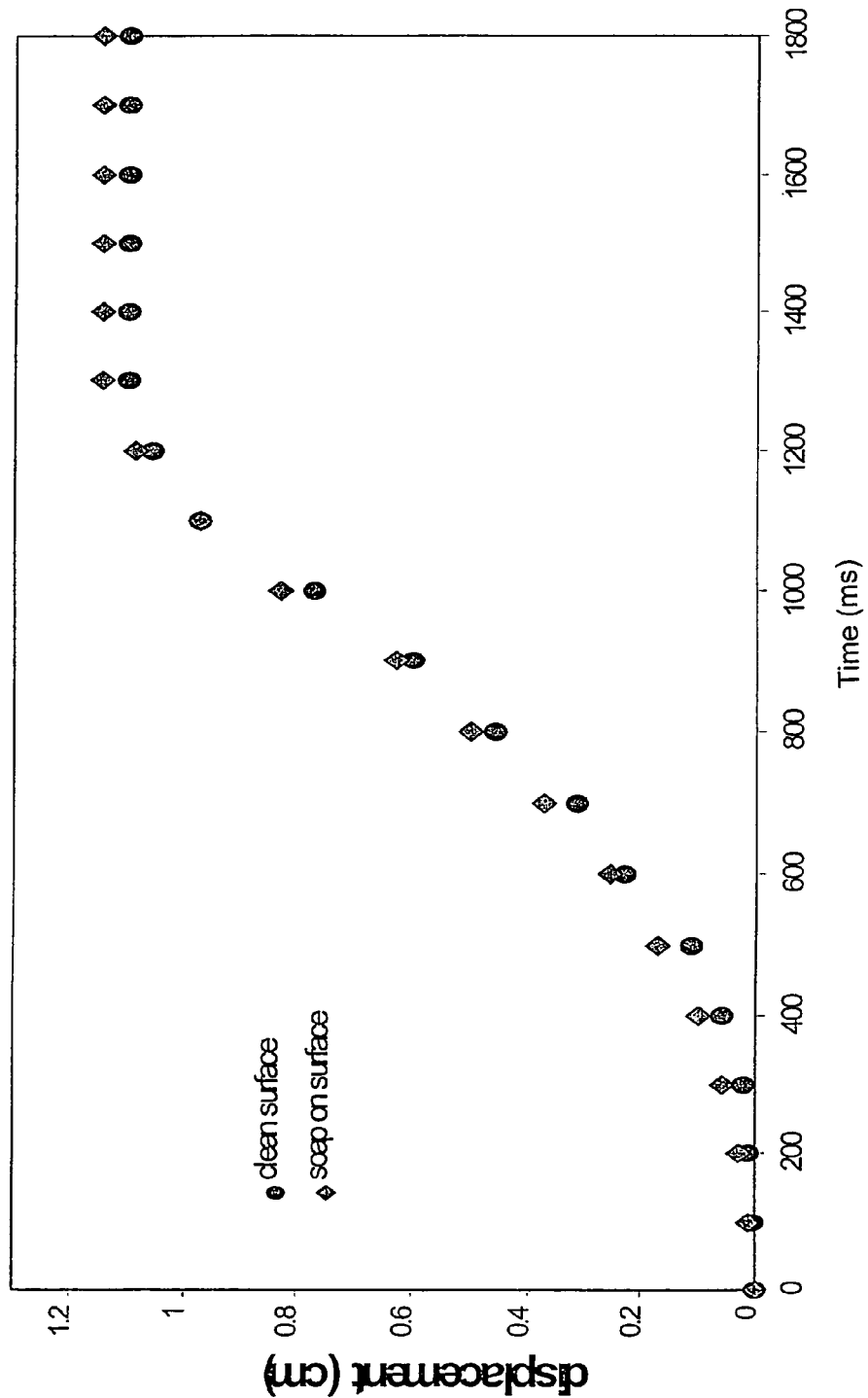
FIG. 5 is graph showing the displacement of a liquid crystalline elastomer over a clean surface of water and over a sample of water that had a layer of soap disposed on its surface.
Figure 6:
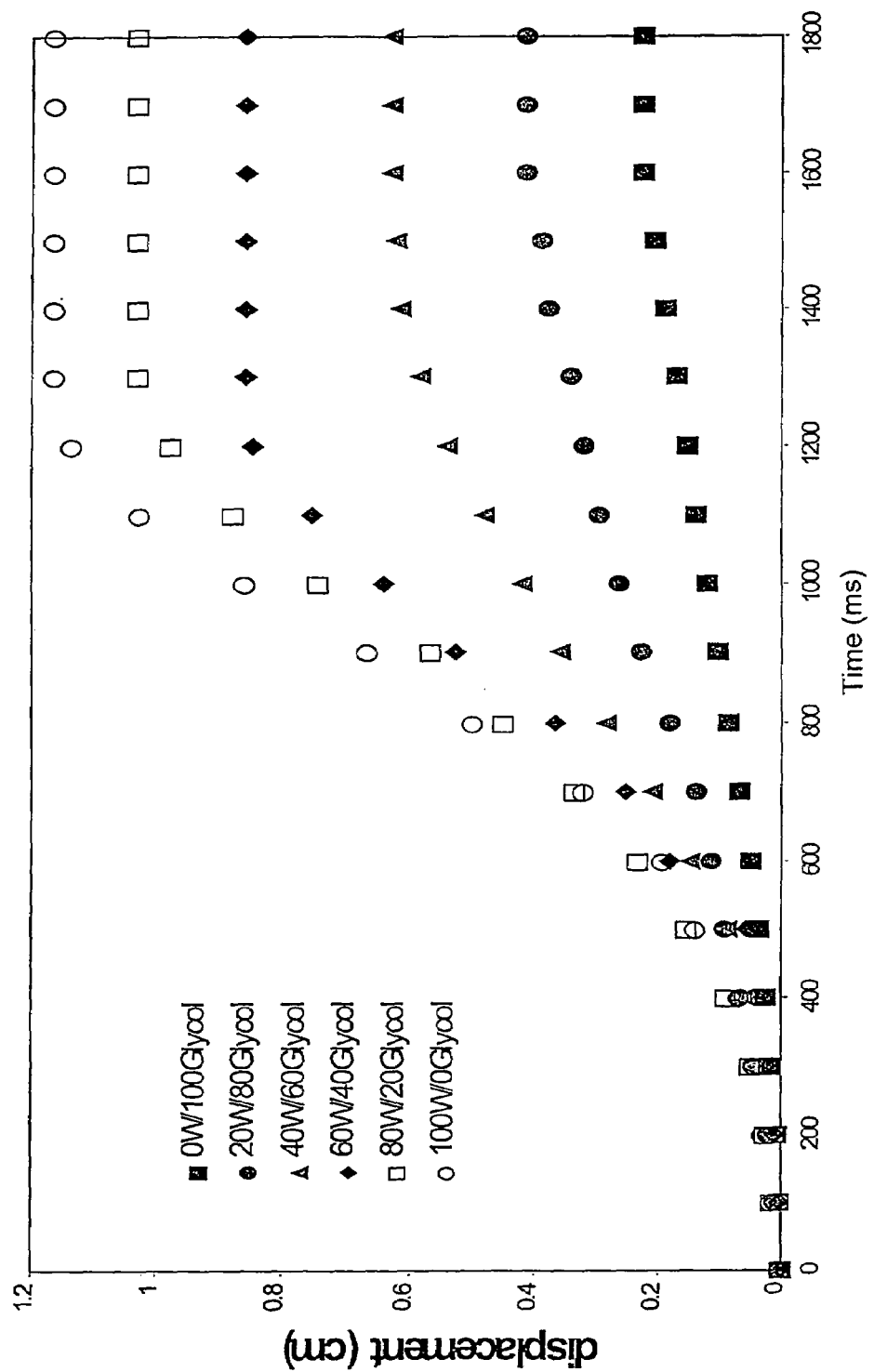
FIG. 6 is a graph showing displacement of liquid crystalline elastomer in different water/ethylene glycol mixtures.

When the sample was floated on other fluids (ethylene glycol, mixtures of ethylene glycol and water, salt water) the same phenomenon was observed, but with different displacements and speed. For example, FIG. 5 shows the displacement of a LCE sample over time over a clean surface of water and over a sample of water that had a layer of soap disposed on its surface. Similarly, the displacement of LCE samples varied with the percentage of water in a water/ethylene glycol mixture is shown in FIG. 6. This is thought to be due to the differences in viscosity between water and ethylene glycol. Thus, in a relatively viscosity fluid (100% water), the speed of the LCE will be greater than in a high viscosity fluid (100% ethylene glycol).

The present invention provides a method for moving a liquid crystal elastomer in contact with a fluid. Alternatively, the LCE may be held fixed and the apparatus may be used to transport a fluid, as in an apparatus for pumping a fluid.

Based upon the foregoing disclosure, it should now be apparent that the liquid crystal elastomer of the present invention will carry out the objects set forth hereinabove. It is, therefore, to be understood that any variations evident fall within the scope of the claimed invention and thus, the selection of specific component elements can be determined without departing from the spirit of the invention herein disclosed and described.

What is claimed is:

1. A method for inducing movement of an object, the method comprising:
    providing an object comprising a liquid crystal elastomer in contact with a fluid; and
    exposing said object to an energy source, whereby said energy source induces a shape change in said object, resulting in movement of said object.

2. The method of claim 1, wherein said liquid crystal elastomer is an organopolysiloxane.

3. The method of claim 1, wherein said energy source is one of a radiative or a conductive energy source.

4. The method of claim 3, wherein said energy source is an electromagnetic radiation source.

5. The method of claim 4, wherein said electromagnetic radiation source is a laser.

6. The method of claim 5, wherein said laser is an Ar laser emitting at 524 nm.

7. The method of claim 1, wherein said object is positioned on a surface of said fluid.

8. The method of claim 1, wherein said fluid is selected from the group consisting of water, ethylene glycol, and mixtures thereof.

9. The method of claim 1, wherein said object further comprises an azo dye.

10. The method of claim 9, wherein said dye is present in an amount of from 0.01 to 4% by weight of said liquid crystal elastomer.

11. The method of claim 1, wherein said liquid crystal elastomer contains pendant mesogenic groups.

12. The method of claim 1, wherein said energy source contracts at least a portion of the object due to a change in the orientation of mesogenic phases in the liquid crystal elastomer.

13. The method of claim 1, wherein said liquid crystal elastomer comprises a polysiloxane having a main chain with the formula

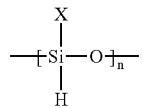

where n is from 20 to 500, X is an alkyl group, and mesogenic pendant side chains having the formula

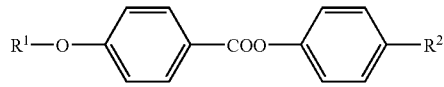

where $R^1$ is an alkenyl group and $R^2$ is selected from the group consisting of alkoxy, cyano, and alkyl groups.

14. The method of claim 1, wherein said liquid crystal elastomer has a crosslink density of from 5 to about 25%.

15. The method of claim 1, wherein said movement of said object is relative to said energy source.

16. The method of claim 1, wherein said liquid crystal elastomer is crosslinked using a compound having the formula

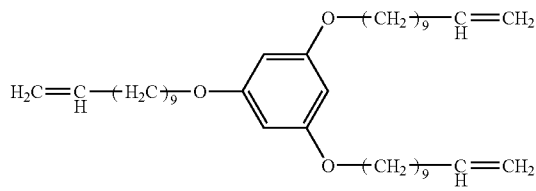

17. An apparatus for producing work, the apparatus comprising a liquid crystal elastomer in contact with a fluid, said liquid crystal elastomer capable of changing shape upon exposure to an energy source.

18. The apparatus of claim 17, wherein said liquid crystal elastomer is held in a fixed position.

19. The apparatus of claim 17, wherein said liquid crystal elastomer undergoes movement in response to said shape change.

20. The apparatus of claim 17, wherein said energy source is an electromagnetic radiation emitter.

21. The apparatus of claim 17, wherein the apparatus is a propulsion system for an object in contact with a fluid.

22. The apparatus of claim 17, wherein the apparatus is a system for moving a fluid.

23. The apparatus of claim 22, wherein the apparatus is a peristaltic pump.

24. The apparatus of claim 17, wherein said liquid crystal elastomer is an organopolysiloxane.

25. The apparatus of claim 17, wherein said liquid crystal elastomer contains pendent mesogenic groups.

26. The apparatus of claim 17, wherein an azo group containing dye is dispersed in said liquid crystal elastomer.

27. The apparatus of claim 25, wherein said pendent mesogenic group is a biphenyl group.

28. The apparatus of claim 25, wherein said liquid crystal elastomer comprises a polysiloxane having a main chain with the formula

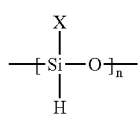

where n is from 20 to 500, X is an alkyl group, and mesogenic pendant side chains having the formula

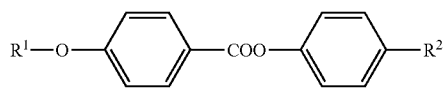

where $R^1$ is an alkenyl group and $R^2$ is selected from the group consisting of alkoxy, cyano, and alkyl groups.

29. The apparatus of claim 17, wherein said liquid crystal elastomer is tubular in shape.

30. A method for inducing movement of a flexible object in contact with a fluid, the method comprising exposing a flexible object to an energy source, whereby the energy source induces a shape change in the object, resulting in the movement of the object.

31. The method of claim 30, wherein said energy source is a mechanical energy source.

* * * * *